(12) United States Patent
Harang et al.

(10) Patent No.: US 11,945,605 B2
(45) Date of Patent: Apr. 2, 2024

(54) MULTI-COMPONENT SATELLITE NETWORK

(71) Applicant: Katalyst Space Technologies, LLC, Flagstaff, AZ (US)

(72) Inventors: Erik Olaf Harang, Flagstaff, AZ (US); Ghonhee Lee, Flagstaff, AZ (US); Nicholas Peter Liapis, Scottsdale, AZ (US)

(73) Assignee: Katalyst Space Technologies, LLC, Flagstaff, AZ (US)

( * ) Notice: Subject to any disclaimer, the term of this patent is extended or adjusted under 35 U.S.C. 154(b) by 0 days.

(21) Appl. No.: 18/143,780

(22) Filed: May 5, 2023

(65) Prior Publication Data

US 2023/0271724 A1    Aug. 31, 2023

Related U.S. Application Data

(63) Continuation of application No. PCT/IB2021/060284, filed on Nov. 5, 2021.
(Continued)

(51) Int. Cl.
*B64G 1/10* (2006.01)
*B64G 1/24* (2006.01)
(Continued)

(52) U.S. Cl.
CPC ............. *B64G 1/1007* (2013.01); *B64G 1/10* (2013.01); *B64G 1/242* (2013.01);
(Continued)

(58) Field of Classification Search
CPC ........ H04B 7/185–195; H04W 64/003; H04W 84/18; B64G 1/1007; B64G 1/10; B64G 1/242; B64G 1/223; B64G 1/503
See application file for complete search history.

(56) References Cited

U.S. PATENT DOCUMENTS

| 4,880,050 A | 11/1989 | Nakamura et al. |
| 5,152,482 A | 10/1992 | Perkins et al. |

(Continued)

FOREIGN PATENT DOCUMENTS

| JP | 2012504522 A | 2/2012 |
| WO | WO-144050 A1 | 6/2001 |

(Continued)

OTHER PUBLICATIONS

Nov. 15, 2021 to Invitation to Correct Defects in PCT/IB2021/060284.
(Continued)

*Primary Examiner* — Raymond S Dean
(74) *Attorney, Agent, or Firm* — Law Offices of Damon L. Boyd, PLLC

(57) ABSTRACT

Retrofittable satellite systems for an in-orbit host satellite comprising an enhancement module for adding a capability to the in-orbit host satellite, modifying the function of the in-orbit host satellite, and/or extending the function of the in-orbit host satellite. The in-orbit, retrofittable satellite system comprises a transfer vehicle for transferring the enhancement module from a first to a second location and a service vehicle for receiving the enhancement module from the transfer vehicle and installing the enhancement module on the in-orbit host satellite. In-orbit space situational awareness systems, comprising one or more in-orbit host satellites having one or more enhancement modules attached thereto, the enhancement modules comprising sensors such as satellite spatial location/position sensors, range sensors, navigation sensors, and/or proximity sensors for detecting other objects in-orbit, their location, speed, acceleration, orbital trajectory or the like, wherein the enhancement modules communicate to create a mesh network between the satellites.

17 Claims, 8 Drawing Sheets

Related U.S. Application Data

(60) Provisional application No. 63/198,692, filed on Nov. 5, 2020.

(51) Int. Cl.
*H04B 7/185* (2006.01)
*H04B 7/19* (2006.01)
*H04W 64/00* (2009.01)
*B64G 1/22* (2006.01)
*B64G 1/50* (2006.01)
*H04W 84/18* (2009.01)

(52) U.S. Cl.
CPC .......... *H04B 7/18513* (2013.01); *H04B 7/19* (2013.01); *H04W 64/003* (2013.01); *B64G 1/223* (2023.08); *B64G 1/503* (2013.01); *H04W 84/18* (2013.01)

(56) References Cited

U.S. PATENT DOCUMENTS

| | | | |
|---|---|---|---|
| 5,806,803 | A | 9/1998 | Watts |
| 5,954,298 | A | 9/1999 | Basuthakur et al. |
| 6,675,095 | B1 | 1/2004 | Bird |
| 7,131,484 | B2 | 11/2006 | Gayrard et al. |
| 7,866,607 | B2 | 1/2011 | Benedict |
| 8,193,968 | B1 | 6/2012 | Kia et al. |
| 8,511,614 | B2 | 8/2013 | Robinson |
| 8,979,034 | B2 | 3/2015 | Goff et al. |
| 9,008,864 | B2 | 11/2015 | Ploschnitznig |
| RE46,206 | E | 11/2016 | Jorgenson |
| 9,829,253 | B2 | 11/2017 | Mishkinis et al. |
| 10,614,544 | B2 | 4/2020 | Jia et al. |
| 10,773,394 | B2 | 9/2020 | Jiang et al. |
| 2003/0159845 | A1 | 8/2003 | Lukas |
| 2006/0192057 | A1 | 8/2006 | Smith et al. |
| 2008/0265098 | A1 | 10/2008 | Connelly et al. |
| 2011/0226907 | A1* | 9/2011 | Robinson ............ B64G 1/1085 244/158.4 |
| 2013/0070666 | A1* | 3/2013 | Miller .................... H04B 7/212 370/326 |
| 2015/0330212 | A1* | 11/2015 | Sassi ........................ E21B 47/26 166/250.1 |
| 2016/0320469 | A1 | 11/2016 | Laifenfeld |
| 2017/0036783 | A1 | 2/2017 | Snyder |
| 2017/0264022 | A1* | 9/2017 | Mroczek ................ H01Q 15/14 |
| 2018/0297724 | A1 | 10/2018 | Harvey et al. |
| 2019/0210746 | A1* | 7/2019 | Feconda ................... G01S 5/10 |
| 2019/0241286 | A1 | 8/2019 | Goff et al. |
| 2019/0315497 | A1* | 10/2019 | Blomquist ............. B64G 1/244 |
| 2021/0367669 | A1* | 11/2021 | Hand .................. H04J 14/0298 |

FOREIGN PATENT DOCUMENTS

| | | | |
|---|---|---|---|
| WO | 2007109838 | A1 | 10/2007 |
| WO | 2022097097 | A1 | 5/2022 |

OTHER PUBLICATIONS

Jan. 12, 2022 Reply to Invitation to Correct Defects in PCT/IB2021/060284.
Feb. 14, 2022 Invitation to Pay Fees in PCT/IB2021/060284.
Feb. 14, 2022 Reply to Invitation to Pay Fees in PCT/IB2021/060284.
Mar. 15, 2022 Written Opinion in PCT/IB2021/060284.
Mar. 15, 2022 International Search Report in PCT/IB2021/060284.
Apr. 19, 2022 Notification of Receipt of Priority Document in PCT/IB2021/060284.
Apr. 22, 2022 Request to Change Order of Inventors in PCT/IB2021/060284.
Apr. 25, 2022 Notification of the Recording of a Change in Order of Inventors in PCT/IB2021/060284.
May 12, 2022 Notice of Publication of International Application in PCT/IB2021/060284.
May 25, 2016 Gordon Roesler, RSGS Proposers Day.
May 22, 2019 Joseph Parrish, RSGS Proposers Day.
May 29, 2017 Reopening the American Frontier: Exploring How the Outer Space Treaty Will Impact American Commerce and Settlement in Space.
Apr. 23, 2008 Lane Haury, Applications of Recent Wireless Standards in Satellite Networking.
Jan. 8, 2014 Richard Alena, Wireless Space Plug-and-Play Architecture (SPA-Z).
Jun. 29, 2020, NASA SBIR 2020-I Solicitation Wireless Communication for Avionics and Sensors for Space Applications.
Oct. 6, 2023 Non-Final Office Action for U.S. Appl. No. 18/035,570.
Aug. 18, 2023 Non-Final Office Action for U.S. Appl. No. 18/143,744.

* cited by examiner

MULTI-COMPONENT SATELLITE NETWORK

CROSS REFERENCE TO RELATED APPLICATIONS

This patent application is an application claiming priority under 35 U.S.C. §§ 111(a) and 365(a) to PCT/I62021/060284, entitled "DEVICES, SYSTEMS AND METHODS FOR AUGMENTING SATELLITES," filed Nov. 5, 2021, which is related to and claims priority under 35 U.S.C. § 119(e) to U.S. Provisional Patent Application No. 63/198,692, entitled "NOVEL METHOD TO AUGMENT EXISTING SATELLITES WITH SITUATIONAL AWARENESS SENSING CAPABILITY," filed Nov. 5, 2020, which is incorporated by reference in its entirety for all purposes.

FIELD OF THE INVENTION

The invention relates to the augmentation of satellites, for example, by providing an enhancement module that adds a capability to the satellite, modifies the function of the satellite, and/or extends the function of the satellite.

BACKGROUND

Satellite operations have remained essentially unchanged since 1957 when the first manmade object was launched into orbit. With the exception of the Hubble Space Telescope and the International Space Station, both of which required manned missions to service, satellites are launched with a certain level of hardware technology capability which does not change throughout the duration of the satellite's mission. Due to the long lifespans necessitated by the large, combined asset and launch costs, the result is outdated technology in space assets long before their end of life. In other words, while the rate of technological advancement is exponentially increasing, the traditional method of satellite development and operation has not been able to maintain this same pace due to the unit economics and cost of space access. As a result, technology on orbit significantly lags terrestrial capabilities on average and at any given point in time.

In this regard, satellite-based business models are bottlenecked by the current mode of satellite operations causing new, innovative business models to be economically infeasible. This is caused by two primary reasons—satellite operations and satellite design. As it relates to the traditional satellite design process, satellites are typically produced as a one-off design or a series of similar designs discretely designed to serve one specific set of mission objectives.

While some base-level design decisions and components, such as the main bus, can be used across several different missions and satellite designs, the general industry process is to redesign and produce a new, specific solution to serve a certain purpose, even if much of the componentry is similar across missions. A different set of mission objectives or different payload technology will often necessitate a redesign of several subsystems, if not the entire satellite. This method of designing and integrating satellites is costly and skilled-labor intensive, and the resulting product is not assembled in a manner that can be easily taken apart for servicing or repair on the ground by the skilled technicians that built the satellite, let alone on-orbit by a general servicing satellite.

Moreover, due to high asset cost and necessary long lifespan for full asset depreciation and return on investment under the current systems of satellite operations, the technology in orbit at any discrete point in time significantly lags the technology available terrestrially. The nature of these systems results in a relatively static commercial (and governmental) technological space marketplace as expansion into dynamic marketspaces with changing customer behavior is effectively infeasible due to financial considerations.

Thus, systems are currently in development along the lines of limited in-orbit repair and small lifetime extensions. However, both are problem mitigations, not solutions, due to the static nature of the value providing technology contained by the satellite.

Moreover, there is little technology that addresses incorporating regularly planned, autonomous or semi-autonomous in-orbit hardware exchanges to increase the capabilities of space assets such as satellites, thereby enabling longer lifespan for satellites and similar space assets and which ultimately allow for new business models to be explored by satellite operators as the hardware limitations imposed by launching a static technology level are removed.

Additionally, geosynchronous and/or geostationary orbits (GEO) provide significant benefit to humanity and continue to be used in high-value, high-need economic ventures as well as significantly valuable scientific endeavors. However, while collisions between space assets or collisions between space assets and orbital debris within GEO have been thought to be relatively rare, low-probability occurrences, recent literature published in 2018 entitled: "A comprehensive assessment of collision likelihood in Geosynchronous Earth Orbit" suggests that the probability of collision may be significantly higher—on the order of one expected collision every four years between an active GEO satellite and an object larger than one centimeter.

Additionally, the relative velocities during collisions are likely to be substantially higher than previously expected due to objects in highly eccentric orbits crossing the GEO belt. These risks are compounded by the fact that ground-based sensing capability to the GEO belt is limited to detection of objects roughly greater than one meter in diameter, making much of the debris posing significant risk to high-economic value space assets undetectable. These routine collisions that have gone unnoticed and untracked to date are theorized to be potential causes in a number of undiagnosed GEO satellite losses.

This risk of collision combined with the extreme economic value of the GEO belt and the long-term cost of any number of collisions between objects in the GEO belt necessitate higher-fidelity space situational awareness technology for satellites occupying the GEO belt. By augmenting traditionally ground-based satellite collision avoidance operations with data collected in-situ, higher confidence collision avoidance becomes possible by making the satellite (s) at risk of collision active participants in the collision avoidance algorithm.

Thus, systems and methods that provide for the augmentation of satellites, for example, by providing an enhancement module that adds a capability to the satellite, modifies the function of the satellite, and/or extends the function of the in satellite are desirable.

SUMMARY

The present disclosure provides devices, systems and methods for an in-orbit, retrofittable satellite system for an in-orbit host satellite comprising an enhancement module for adding a capability to the in-orbit host satellite, modifying the function of the in-orbit host satellite, and/or extending the function of the in-orbit host satellite. The in-orbit, retrofittable satellite system further comprises a transfer vehicle for transferring the enhancement module from a first location to a second location and a service vehicle for receiving the enhancement module from the transfer vehicle and installing the enhancement module on the in-orbit host satellite. The in-orbit, retrofittable satellite system may further comprise multiple enhancement modules.

The present disclosure further comprises devices, systems and methods for an in-orbit space situational awareness system. The term "space domain awareness" is sometimes used as an equivalent of space situational awareness, though for convenience of reference, "space situational awareness" is used herein. In-orbit space situational awareness systems in accordance with the present disclosure comprise one or more in-orbit host satellites having one or more space situational awareness enhancement modules attached thereto, the space situational awareness enhancement module comprising sensors such as satellite spatial location/position sensors, range sensors, navigation sensors, and/or proximity sensors for detecting other objects in-orbit, their location, speed, acceleration, orbital trajectory or the like, wherein the space situational awareness enhancement modules communicate to create an in-orbit mesh network between the in-orbit host satellites.

BRIEF DESCRIPTION OF THE DRAWINGS

The accompanying drawings provide a further understanding of the invention and are incorporated in and constitute a part of this specification, illustrate embodiments of the invention, and together with the description serve to explain the principles of the invention.

DETAILED DESCRIPTION

Figure 1:
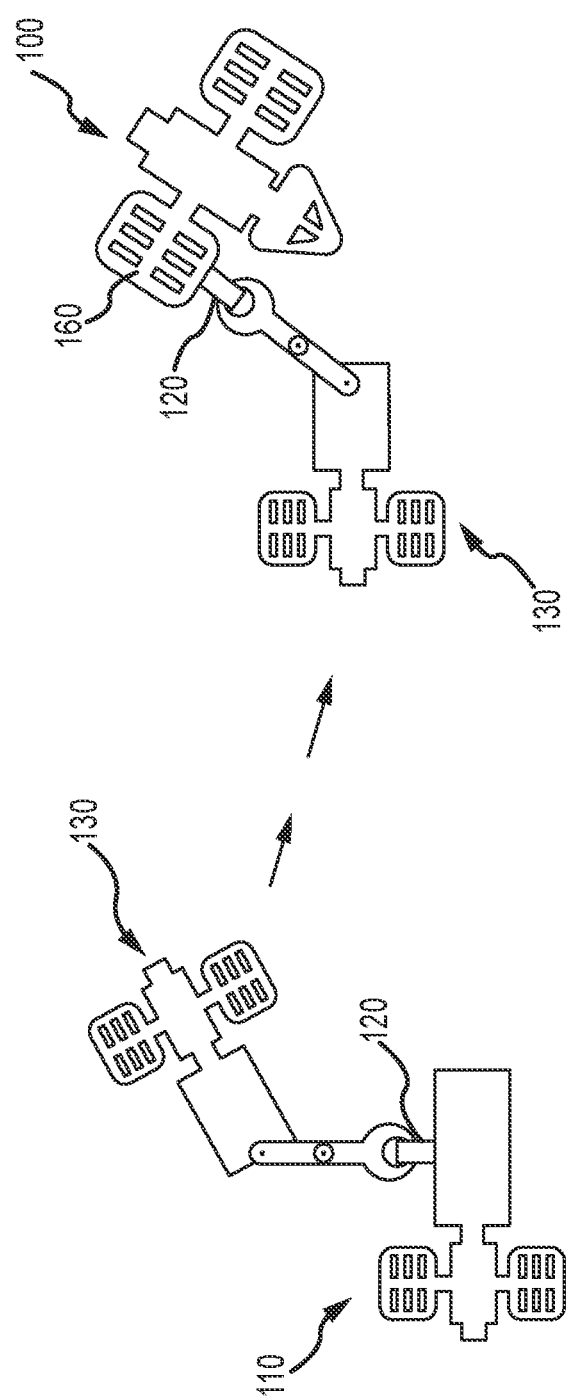
FIG. 1 is an illustration of a transfer vehicle, a service vehicle, a host satellite and an enhancement module of a retrofittable satellite system in accordance with the present disclosure.

Persons skilled in the art will readily appreciate that various aspects of the present invention may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale but may be exaggerated to illustrate various aspects of the present invention, and in that regard, the drawing figures should not be construed as limiting. Finally, although the present invention may be described in connection with various principles and beliefs, the present invention should not be bound by theory.

The above being noted and as will be described in more detail below, the present disclosure contemplates devices, systems and methods for an in-orbit, retrofittable satellite system for in-orbit host satellites comprising enhancement modules for adding one or more capabilities to in-orbit host satellite, modifying the function of the in-orbit host satellite, and/or extending the functions of in-orbit host satellites. The present disclosure further comprises devices, systems and methods for an in-orbit space situational awareness system, comprising one or more in-orbit host satellites having one or more space situational awareness enhancement modules attached thereto, the space situational awareness enhancement module comprising sensors such as satellite spatial location/position sensors, range sensor, navigation sensors, and/or proximity sensors for detecting other objects in-orbit, their location, speed, acceleration, orbital trajectory or the like, wherein the space situational awareness enhancement modules communicate to create a decentralized, in-orbit, mesh positioning, ranging, navigation and/or proximity network between the in-orbit host satellites. Such networks allow for benefits such as mitigation of collision risk, as well as the creation of high-fidelity simulations of the GEO belt debris as debris encounters and characteristics can be collected and verified by in-situ sensing capability.

For example, in accordance with the present disclosure, an in-orbit retrofittable satellite system allows an in-orbit host satellite (or simply, "host satellite") to be retrofitted with a module for changing the capability and/or functional operability of the host satellite. In this regard, "retrofit" or "retrofittable" refers to the addition of a new device (i.e., a "module" or "enhancement module") to an original device (i.e., a satellite) that was not available, necessary, or present when the original device was manufactured. In the context of the present disclosure, the enhancement module is retrofit to the host satellite to add capabilities to or otherwise modify a function of the host satellite, including those described hereinbelow. The enhancement modules may also extend a capability or function of the host satellite. In accordance with various alternative aspects of the present disclosure, enhancement modules may be attached to host satellites on earth and/or prior to being placed in orbit.

In accordance with the present disclosure, with reference to FIG. 1, the retrofittable satellite system may comprise a transfer vehicle 110 for transferring the enhancement module 120 from a first location to a second location. For example, the first location may be earth or a module transport spacecraft and the second location may be a location proximate a service vehicle 130. The service vehicle 130 receives the module 120 from the transfer vehicle 110 and takes the module 120 to a host satellite 100 for attachment or installation on the host satellite 100. In accordance with some aspects of the present disclosure, the transfer vehicle 110 and the service vehicle 120 may be the same vehicle, such that it both transfers the module 120 from the first location (e.g., earth or a spacecraft) to the host satellite 100 (the second location), where in turn it adds or removes modules 120 to the host satellite 100 (as described herein).

In accordance with the present disclosure, in addition to the attachment or installation of modules 120 host satellites 100, the service vehicle 120 may also remove modules 120 and other components from host satellites 100, for example, for replacement with new modules 120 with new or different capabilities or with the same, for example, to extend the life of the mission of the host satellite 100.

Figure 2:
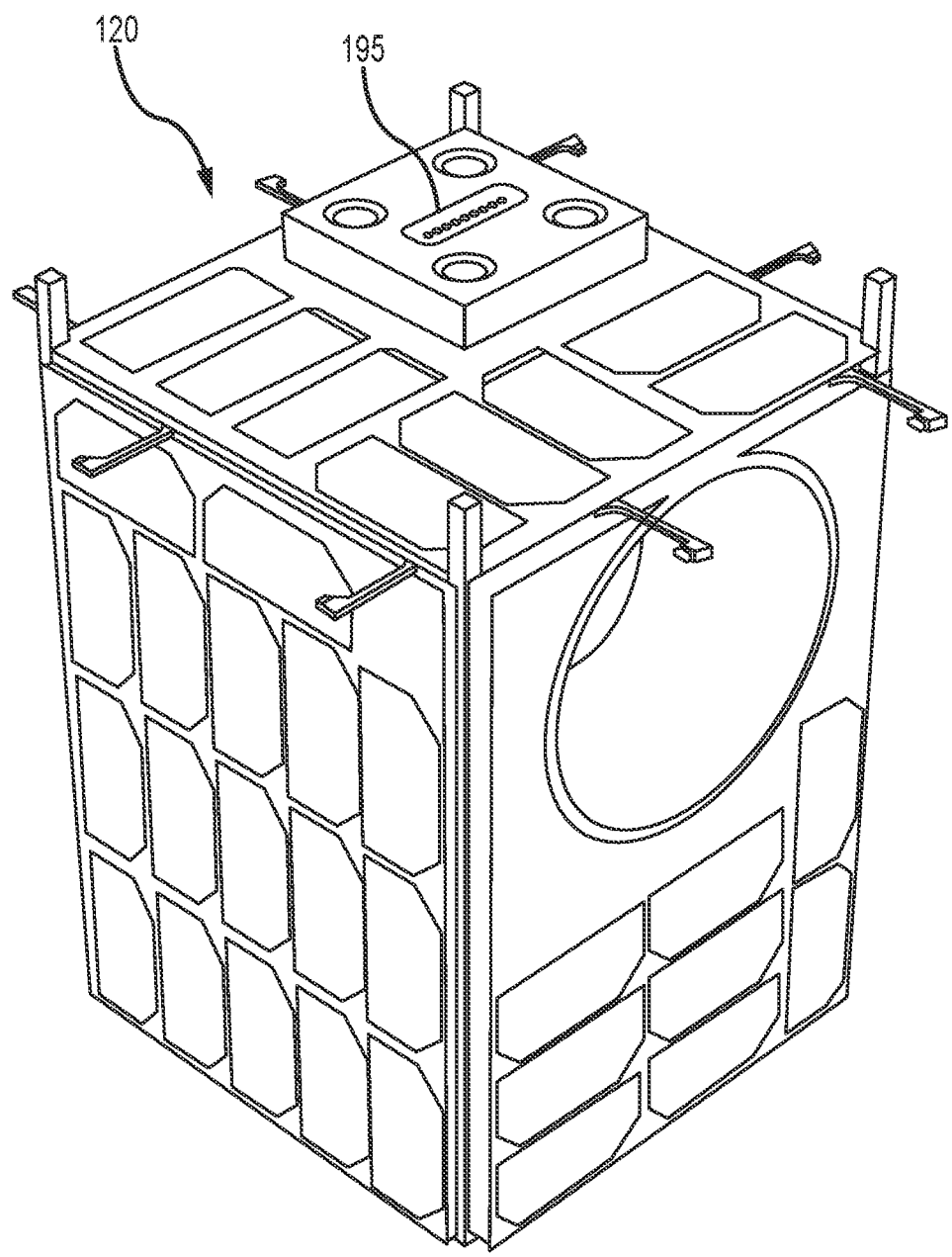
FIG. 2 is a perspective view of the top of an enhancement module with a connector port used to interface with the service vehicle.

In accordance with the present disclosure, with reference to FIG. 2, the enhancement module 120 may include one or more female connector ports 195 used as an interface for communication between the service vehicle 130 and the host satellite 100 for example, during installation or removal of enhancement modules and other similar processes.

Figure 3:
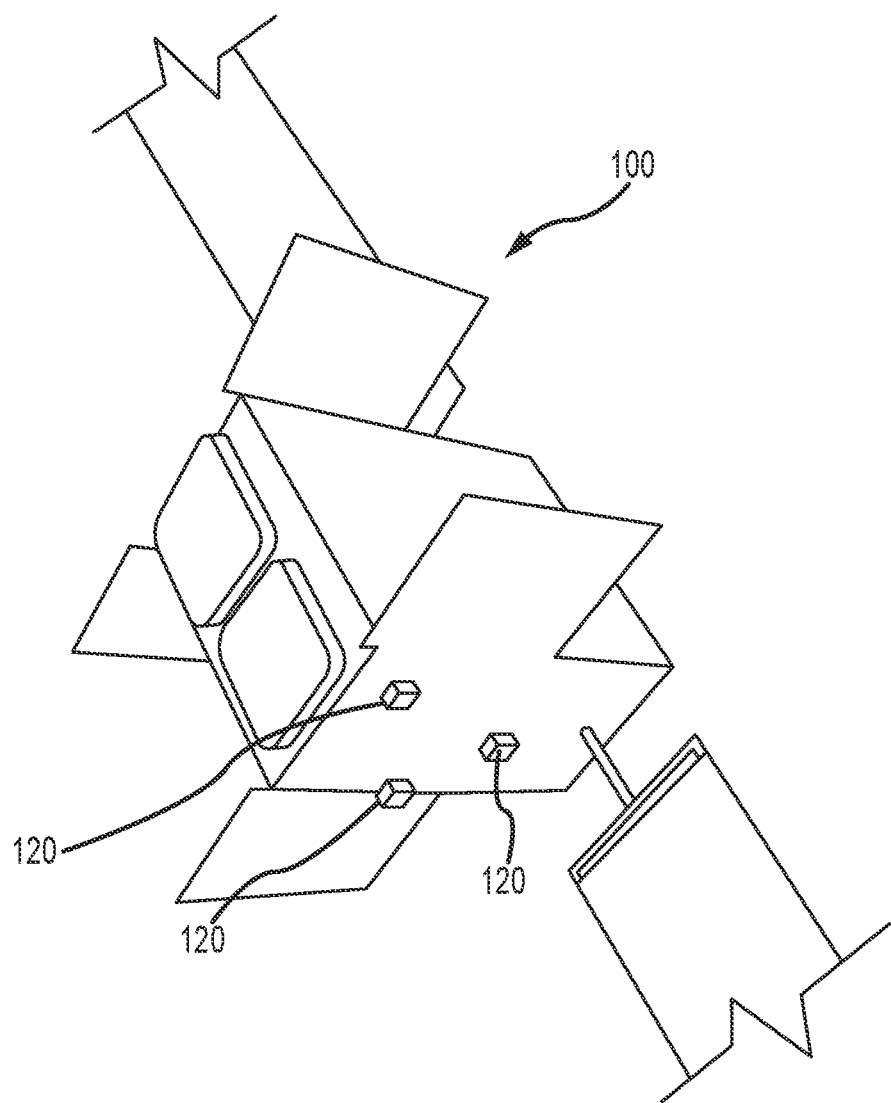
FIG. 3 is a perspective view of a host satellite with multiple enhancement modules attached thereto in accordance with the present disclosure.

In accordance with the present disclosure, the module 120 may simply be attached (as described below) to the host satellite 100 and operate independently of the functionality of the host satellite 100, though in other applications, the module 120 may be functionally installed on the host satellite 100 such that it communicates and operates with the existing functionality of the host satellite 100. Additionally, in accordance with various aspects of the present disclosure, the transport vehicle 110 may carry multiple modules 120 of similar or varying capabilities, and the service vehicle 130 may install multiple modules 120 on one or more host satellites (e.g., as shown FIG. 3).

Figure 4:
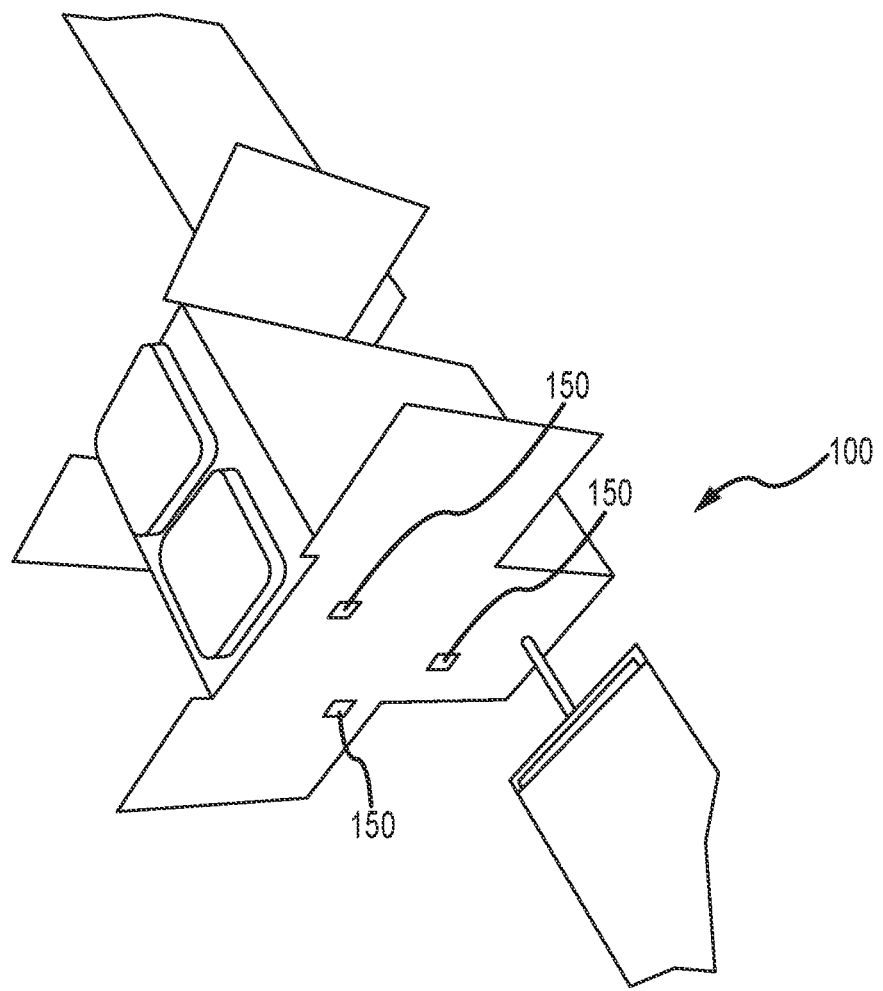
FIG. 4 is a perspective partial view of a host satellite illustrating multiple attachment mechanisms in accordance with the present disclosure.
Figure 5:
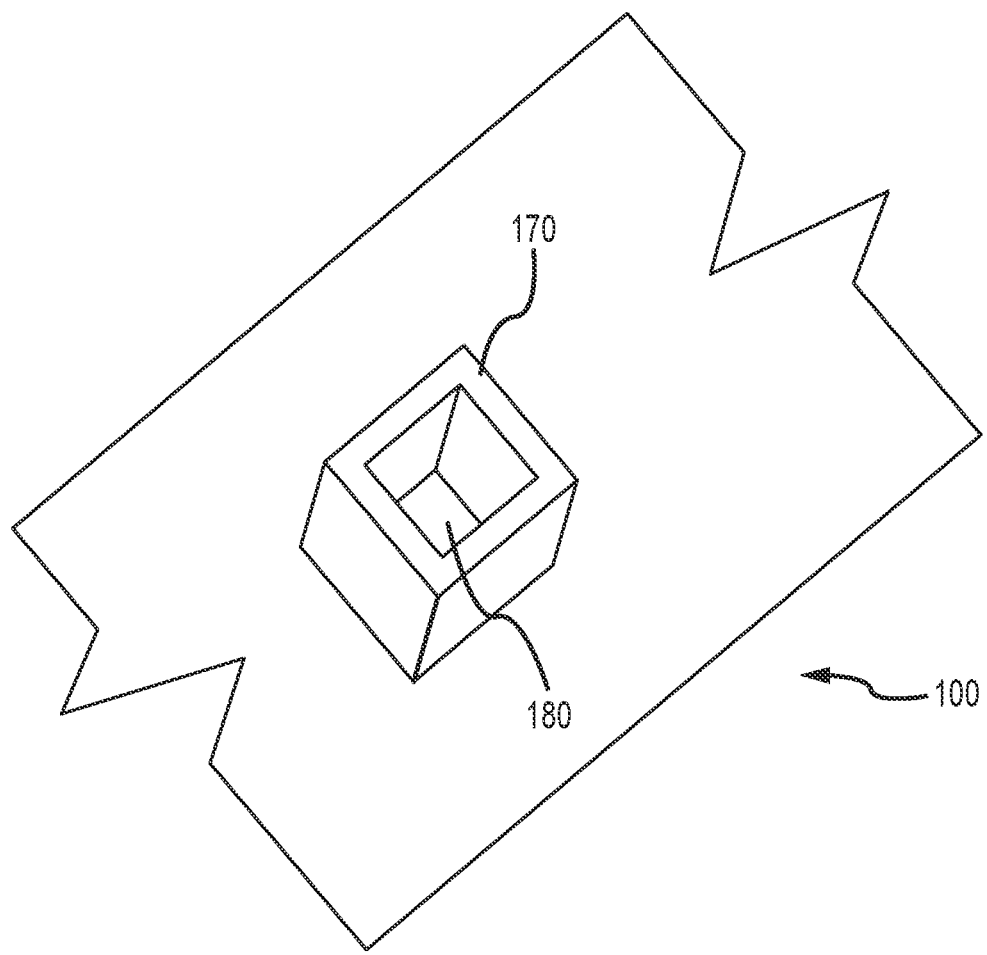
FIG. 5 is a close-up perspective view of an attachment mechanism on a host satellite configured as bin for receiving an enhancement module in accordance with the present disclosure.

In accordance with the present disclosure, with reference to FIG. 4, the host satellite 100 may have one or more attachment mechanisms 150 for receiving the enhancement module 120. For example, with reference to FIG. 5, a close up view of an attachment mechanism 150 configured as bin having a raised perimeter 170 with an aperture 180 configured with a profile similar to the module 120 itself so as to "snugly" receive the module 120 therein and may further include additional attachment and/or module 120 and host satellite 100 communication means such those disclosed below.

In accordance with alternative aspects of the present disclosure, the bin-style attachment mechanisms 150 may be reversed in orientation between the modules 120 and the host satellite. In other words, the host satellite 100 may include a host projection (not shown) extending from the surface of the host satellite and the module 120 may include an aperture that receives the projection from the host satellite to facilitate connection therebetween.

The attachment mechanism(s) 150 facilitates the connection of the module 120 to the host satellite. In accordance with various aspects of the present disclosure, the attachment mechanism 150 may simply provide a secure mounting point with no interface or communication (i.e., with control system, power supply, or the like) between the module 120 and the host satellite 100. For example, non-limiting examples of attachment mechanisms 150 may include means for securing the module 120 to the host satellite, often, though not necessarily, on a general flat surface of the host satellite 100, including base plates, synthetic setae, adhesives, welding, magnets bolts, screws and the like. With brief reference to FIG. 6, four "panels" 185 on enhancement module 120 illustrate the possible placement and location of such synthetic setae, adhesives, base plates, or magnets, though other shapes, configurations and numbers of panels may be substituted and still fall within the scope of the present disclosure.

In accordance with various additional (or alternative) aspects of the present disclosure, the enhancement modules 120 may attach to the host satellite 100 via any known or as yet known mechanism, such as, for example, rivets, screws, hot-melt compounds, mechanical clamps or other hard point attachment mechanisms, Van Der Waals forces, electrostatic adhesion, and other methods of adhesion similar to tape.

In accordance with other aspects of the present disclosure, the attachment mechanism 150 may provide communication between the host satellite 100 and the enhancement module 120. Communication may include electronic, optical or other one or two-way communication with host satellite components related to control systems, power supplies, processing systems, and the like. For example, additional communication options may include inter-module communication on a single host satellite 100 via electromagnetic radiation, wired data connection of electrical or optical type or other possible physical, wired or wireless communication types; modules containing one or more sensors suited specifically to, but not limited to rendezvous and proximity operations with communication enabling low-latency data-transfer to assist in rendezvous and proximity operation maneuvers between one or more participating satellites; enhancement modules 120 containing one or more sensors suited specifically to, but not limited to impact avoidance and or close proximity satellite detection, and or close proximity satellite identification; enhancement modules 120 that contain and are capable of deploying countermeasures in response to a perceived threat; and enhancement modules 120 that use the Tracking and Data Relay Satellite (TDRS) Systems for communication with other enhancement modules 120 and or ground stations.

With reference back to FIGS. 4 and 5 and the bin-style attachment mechanisms 150, the bins may include bin-module interface connectors (not shown) and the enhancement module 120 may include module-bin interface connectors (not shown), wherein an enhancement module projection or the enhancement module 120 itself is inserted into the bin such that the bin-module interface connectors and the module-bin interface connectors connect to form a bin-enhancement module combination, with the above-noted communication therebetween.

In accordance with other aspects of the present disclosure, the bin-module interface connectors and the module-bin interface connectors may include any now known or as yet unknown method of connecting to components that must communicate with one another, such as through male and female pin connectors, androgenous pin connectors, optical connectors, NFC, Bluetooth, IR, RF and the like.

In accordance with other aspects of the present disclosure, enhancement modules 120 may be configured in any desirable size, shape and/or geometry depending on the particular application. For example, with reference to FIG. 7, enhancement modules 120 may be slightly larger than a standard basketball 125 thus facilitating the enhancement modules 120 and/or the attachment mechanisms 150 to be attached to any number of locations on a host satellite, depending on the application, though in accordance with various aspects of the present disclosure, because of their larger areas of the radiator panels 160 relative to the size of the body of most satellites, as illustrated in FIG. 1, the enhancement modules 120 and/or attachment mechanisms 150 may be attached to radiator panels 160 on the host satellites 100.

In accordance with the present disclosure, enhancement modules 120 provide any number of increased or enhanced capabilities, such as space situational awareness capabilities, including for example, space traffic management, local space awareness, orbital data and various other information related to the space surrounding the host satellite 100 to which the enhancement module 120 is attached. Enhancement modules 120 in accordance with the present disclosure may also allow "mission extension" capabilities. For example, older host satellites 100 that be nearing the end of their functional relevance of capabilities may have enhancement modules 120 retrofitted to them to provide new capabilities or improve or extend the life of old capabilities, such earth to orbit satellite communications, GPS, optical and radio telescopic, etc. The enhancement modules 120 may also provide the ability to add power to the host satellites 100 and/or reposition host satellites 100 that are losing or have lost the ability to reposition (if they ever had the ability).

In accordance with various aspects of the present disclosure, the enhancement modules 120 may also provide the ability for enhancement modules 120 to communicate with one another on the same host satellite 100, different host satellites 100, or both, which in turn can add new capabilities related to the various space awareness functionalities mentioned above and described in more detail hereinbelow.

Figure 6:
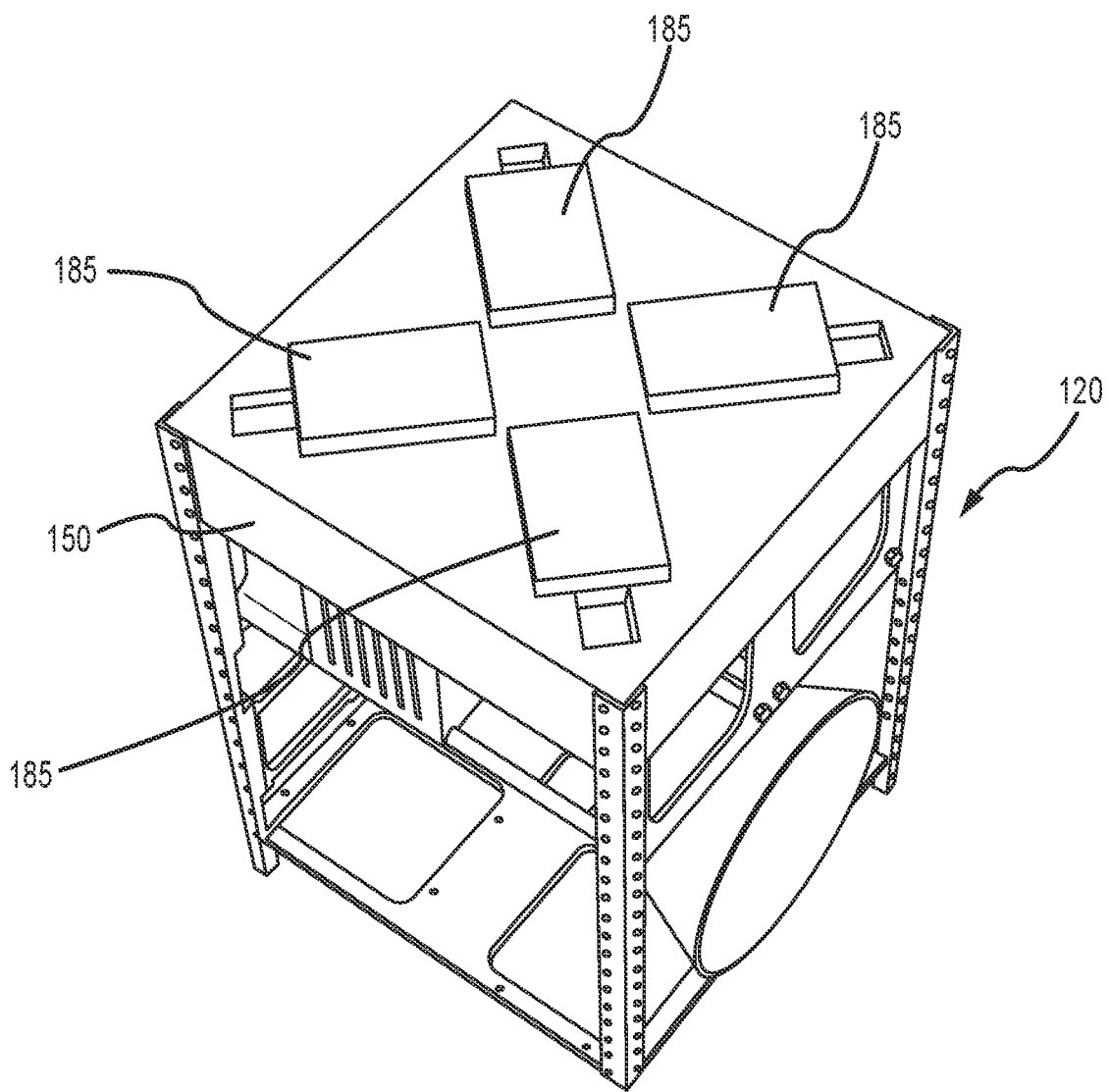
FIG. 6 is a perspective view of the bottom of an enhancement module with multiple attachment mechanisms in accordance with the present disclosure.
Figure 7:
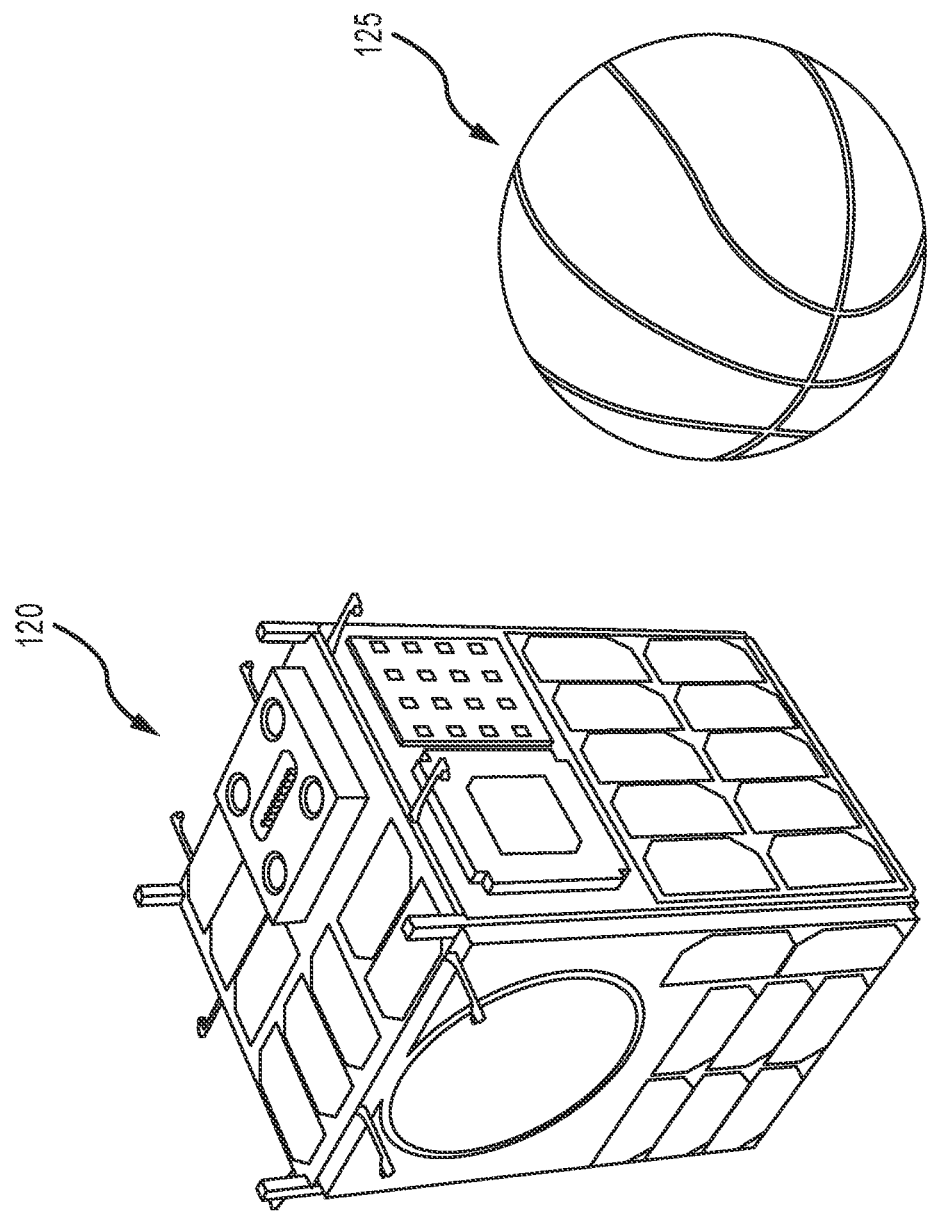
FIG. 7 is a perspective view of an enhancement module relative to a standard basketball in accordance with the present disclosure.

In accordance with various aspects of the present disclosure and with reference to FIGS. 2, 6 and 7, various components that may be included in enhancement modules 120 are illustrated. For example, in accordance with various aspects of the present disclosure, a variety of conventional satellite components, now known or as yet unknown, may be included with the enhancement modules, including but not limited to:

onboard processors (which may include FPGA logic gates);
power generation components such as one or more solar panels;
power storage components such as one or more batteries;
one or more power distribution units;
one or more optical sensor systems (for example, one or more cameras); and
communication arrays (for near and/or far communication).

Figure 8:
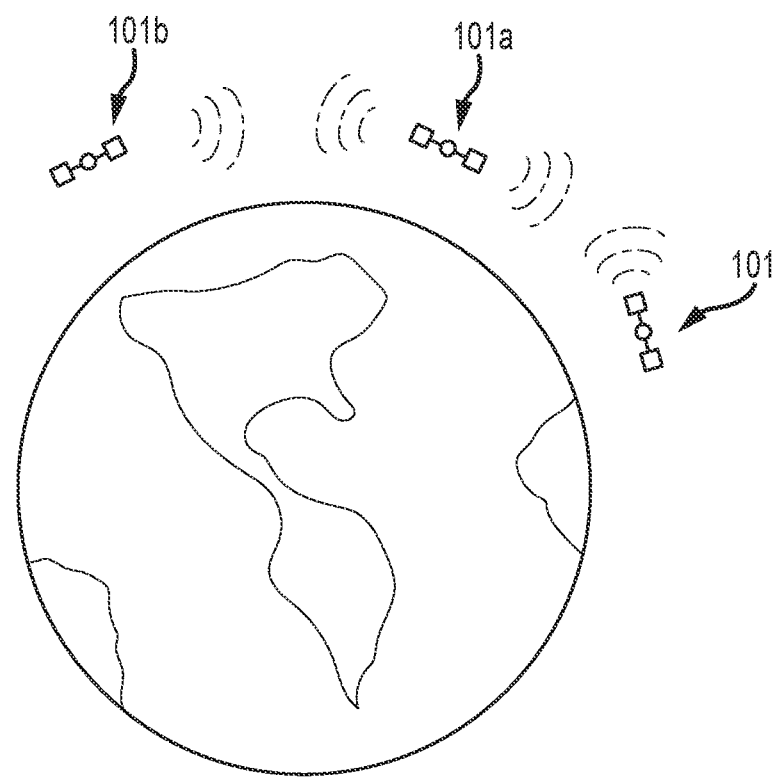
FIG. 8 is an illustration of the earth orbited by a number of host satellites with space situational awareness enhancement modules attached thereto in accordance with the present disclosure.

In accordance with the present disclosure, the retrofittable satellite system may provide an in-orbit space situational awareness system through enhancement modules 120 attached to host satellites. For example, with reference to FIG. 8, a first in-orbit host satellite 101 having a space situational awareness enhancement module 120 attached thereto, the space situational awareness enhancement module comprising sensors such as satellite spatial location/position sensors, range sensor, navigation sensors, and/or proximity sensors for detecting other objects in-orbit, their location, speed, acceleration, orbital trajectory or the like.

In accordance with the present disclosure, one or more space situational awareness enhancement modules 120 may be attached to the first in-orbit host satellite 101 without a direct interface with any power, processing or control systems of the first in-orbit host satellite 101, though in accordance with other aspects, the space situational awareness enhancement module 120 may have a direct interface with power, processing or control systems of the first in-orbit host satellite 101.

In accordance with the present disclosure, the space situational awareness enhancement module 120 may use electro-optical, RADAR, LIDAR, IR, RF or the like to determine space object information related to characteristics such as relative size, geometry, and/or an identification of other space objects in-orbit.

In accordance with the present disclosure, the space situational awareness enhancement module 120 on the first in-orbit host satellite 101 transmits the space object information to a ground-based space situational awareness system for processing the space object information for purposes such as those described hereinbelow.

In accordance with the various alternative aspects of the present disclosure, the in-orbit space situational awareness system may comprise a "hub-and-spoke" space situational awareness mesh network further comprising one or more additional space situational awareness enhancement modules 120 attached to at least one additional in-orbit host satellite 101a, 101b that transmits additional object information to the ground-based space situational awareness system.

In accordance with the various alternative aspects of the present disclosure, the space situational awareness enhancement modules 120 may communicate with space assets including additional in-orbit host satellites 101a, 101b, which in turn creates an in-orbit mesh network between the in-orbit host satellites.

In accordance with the various alternative aspects of the present disclosure, the space situational awareness enhancement modules 120 may also or alternatively communicate with space assets other than in-orbit host satellites 101a, 101b such as other space craft, non-host satellites and/or other intermediary systems such as ground based systems and other intermediary space situational awareness systems to create an in-orbit mesh network.

In accordance with the present disclosure, one or more of the in-orbit host satellites 101, 101a, 101b are configured to change trajectory based on input from the hub-and-spoke space situational awareness mesh network.

Thus, in-orbit space situational awareness systems in accordance with the present disclosure provide for the ability of the space situational awareness enhancement modules 120 to be placed in a manner that maximizes the statistical likelihood of detection of threatening objects in potentially intersecting trajectories based on orbital parameters and risk characteristics of the mission. For example, the cluster nature of the modules 120 can be used to optimize system behavior.

Additionally, if there is no line-of-sight between space situational awareness enhancement modules 120 attached to the same host satellite 100, communication between the modules 120 can be accomplished via an acoustic-mechanical schema targeting the resonant frequency range of the launch vehicle for the host satellite 100 to minimize interference and vibration effects felt by sensitive electronics within the host satellite.

Additionally, communication between space situational awareness enhancement modules 120 on the same host satellite 100 may be accomplished by any other means of wired or wireless communication including but not limited to wired electric, wired optical, wireless optical, electromagnetic, wireless electromagnetic, and other known or as yet unknown methods of producing module to module communication.

In the event an enhancement module that is acting as a transmission relay for a second enhancement module in the chain to communicate with a third enhancement module loses pass-through communication capability or otherwise becomes non-responsive, a passive communication relay method may be utilized comprising a fixed length of fiber-optic or other waveguide of variable shape along its length to passively pass electromagnetic radiation to the third enhancement module from the second enhancement module without the need for communication and interaction from the second enhancement module. Additionally, a similar effect can be accomplished using mirrors, flat reflectors, refractors, waveguides and/or repeaters depending on the orientation of enhancement modules and communication schema. Further still, the signal acquired by the passive routing mechanism may be split to communicate with more than one enhancement module at a time using a single signal.

In accordance with various aspects of the present disclosure, inter-module communication within the bounds of the same host satellite 100 may allow for "cluster" behavior to drive the communication and interaction schema with other enhancement modules 120 besides the enhancement modules 120 on the same host satellite 100. This clustering behavior allows for risk reduction of the severity of any single module failure.

In accordance with various aspects of the present disclosure, enhancement modules 120 on different host satellites 100 may communicate between each other in a manner similar to other space assets, using varying frequencies of electromagnetic radiation or any other methodology chosen to be appropriate including optical LASER systems. Similarly, the enhancement modules 120 may communicate with other space assets or directly to ground stations using varying frequencies of electromagnetic radiation or any other methodology chosen to be appropriate including optical LASER systems.

Enhancement modules 120 may use ground stations or other space assets as a relay when communicating between modules on different host satellites. In the event multiple modules 120 are attached to a single host satellite 100, the most optimal module attached to the host satellite 100 may be dynamically chosen as the "clusterhead" to communicate to other enhancement modules 120 besides the enhancement modules 120 on the same host satellite 100 based on orientation, power, bandwidth and/or other heath monitoring and/or performance metrics.

In accordance with various aspects of the present disclosure, designated communication roles can shift between enhancement modules 120 depending on desired outcomes of the mission and the additional external actors. This switching behavior can be tailored to optimize resource use based on the cluster nature mechanics of the enhancement module groups, including transitioning into separate colonies in the event of an irrecoverable cluster communication link failure. In the event more than one host satellite 100 is in near proximity, the enhancement modules 120 can communicate within a single host satellite 100 to the optimal enhancement module 120 and this optimal enhancement module 120 can then communicate directly with an optimal enhancement module 120 on another host satellite 100. The optimal enhancement module 120 on the second host satellite 100 may then communicate directly to a ground station or another space asset or it may communicate inside its host group of enhancement modules 120 to another optimal enhancement module 120 for communication to a ground station or another space asset.

In accordance with another aspect of the present disclosure, another implementation of enhancement modules for increased space situational awareness related to positioning, ranging, navigation and proximity sensing comprises all the above description, as well as including the distinction of separable base units and top units within a single enhancement module 120. For example, with reference to FIG. 6, the base unit comprises the mechanical attachment mechanisms 150 to the host satellite 100, a structure to support the top unit and another attachment mechanism to the top unit. The top unit houses the various hardware contemplated herein and structure to support and protect the hardware and the attachment mechanism 150 to the base unit.

In accordance with another aspect of the present disclosure, another implementation of enhancement modules for increased space situational awareness related to positioning, ranging, navigation and proximity sensing comprises all the above description, as well as including the addition of an interface port between at least one of the enhancement modules 120 and the host satellite 100 for use of the host satellite 100 communications and data subsystem. Additional enhancement modules 120 on the same host satellite 100 may communicate with a docked module 120 using wired or wireless communication including but not limited to wired electric, wired optical, wireless optical, electromagnetic, wireless electromagnetic, and other known or as yet unknown methods of producing module to module communication.

Additionally, the docked module 120 may use host satellite 100 power system instead of being isolated from the host satellite. The attachment mechanism 150 may be direct to a custom or pre-existing port on the host satellite 100 or it may be through a pass-through device such as a routing node or other switchable device present at launch or added after launch.

Finally, it will be apparent to those skilled in the art that various modifications and variations can be made in the present invention without departing from the spirit or scope of the invention. For example, numerous materials, shapes, sizes and configurations can be substituted in place of those described herein. Thus, the present disclosure covers the modifications and variations provided they come within the scope of the appended claims and their equivalents.

What is claimed:

1. An in-orbit mesh network, comprising at least two space situational awareness enhancement modules for attachment to a host satellite, each space situational awareness enhancement module comprising at least one of a satellite spatial position sensor, a range sensor, a navigation sensor, and a proximity sensor for detecting other objects in-orbit, and determining at least one of location, speed, acceleration, and orbital trajectory of the other objects, wherein the space situational awareness enhancement modules communicate to create the in-orbit mesh network between the space situational awareness enhancement modules; and wherein the host satellite comprises an attachment mechanism for receiving at least one of the space situational awareness enhancement modules and wherein the attachment mechanism comprises a bin attached to the host satellite, the bin further comprising bin-module interface connectors and the space situational awareness enhancement module further comprising module-bin interface connectors, wherein the space situational awareness enhancement module is inserted into the bin such that the bin-module interface connectors and the module-bin interface connectors connect to form a bin-enhancement module combination such that the space situational awareness enhancement module is in communication with the host satellite.

2. The in-orbit mesh network of claim 1, wherein the space situational awareness enhancement modules use at least one of electro-optical, RADAR, LIDAR, IR, and RF to determine space object information related to characteristics comprising at least one a relative size, a geometry, and an identification of other space objects in-orbit.

3. The in-orbit mesh network of claim 1, wherein at least one space situational awareness enhancement module transmits space object information to an intermediary system.

4. The in-orbit mesh network of claim 3, wherein the intermediary system is a ground based system.

5. The in-orbit mesh network of claim 1, further comprising a hub-and-spoke space situational awareness mesh network further comprising additional space situational awareness enhancement modules on at least one additional host satellite.

6. The in-orbit mesh network of claim 5, wherein at least one of the additional space situational awareness enhancement modules transmits space object information to an intermediary system.

7. The in-orbit mesh network of claim 5, wherein at least one of the host satellites is configured to change at least one of a trajectory, an operating mode, and an orientation based on input from the hub-and-spoke space situational awareness mesh network.

8. The in-orbit mesh network of claim 1, wherein at least one space situational awareness enhancement module communicates with other space assets.

9. The in-orbit mesh network of claim 1, wherein at least one space situational awareness enhancement module is attached to the host satellite without a direct interface with at least one of a power system, a control system and a processing system of the host satellite.

10. The in-orbit mesh network of claim 1, wherein at least one space situational awareness enhancement module comprises an optical sensor.

11. The in-orbit mesh network of claim 1, wherein attachment between the space situational awareness enhancement module and the attachment mechanism is made prior to launching the host satellite.

12. The in-orbit mesh network of claim 1, wherein the bin-module interface connectors and the module-bin interface connectors comprise at least one of male and female pin connectors, androgenous pin connectors, optical connectors, NFC, Bluetooth, IR, and RF.

13. The in-orbit mesh network of claim 12, wherein attachment between the space situational awareness enhancement module and the attachment mechanism is made prior to launching the host satellite.

14. The in-orbit mesh network of claim 1, further comprising a second attachment mechanism for attaching the space situational awareness enhancement module to the host satellite, wherein the attachment mechanism comprises at least one of synthetic setae, an adhesive, welding, magnets, and bolts.

15. The in-orbit mesh network of claim 14, wherein the second attachment mechanism attaches to a radiator panel on the host satellite.

16. The in-orbit mesh network of claim 1, wherein the space situational awareness enhancement modules use at least one of wired electric, wired optical, wireless optical, electromagnetic, wireless electromagnetic means of communication.

17. The in-orbit mesh network of claim 3, wherein the intermediary system is a host spacecraft.

* * * * *